Figures 1, 7:
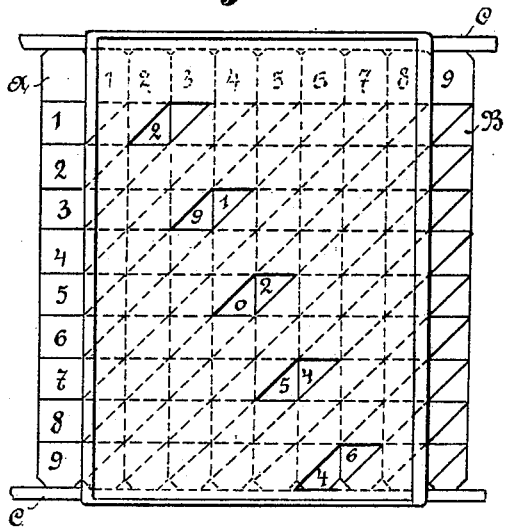

No. 641,294. Patented Jan. 16, 1900.
A. HORVATH.
SYSTEM OF CALCULATING.
(Application filed Feb. 11, 1899.)
(No Model.) 3 Sheets—Sheet 1.

No. 641,294. Patented Jan. 16, 1900.
A. HORVATH.
SYSTEM OF CALCULATING.
(Application filed Feb. 11, 1899.)

(No Model.) 3 Sheets—Sheet 2.

Fig. 2. Fig. 3. Fig. 4.

Fig. 8.

Witnesses
Geo. S. Kennedy.
Frank S. Ober.

Inventor
Arpad Horvath
by Wm. A. Rosenbaum
Asso. atty.

No. 641,294. Patented Jan. 16, 1900.
A. HORVATH.
SYSTEM OF CALCULATING.
(Application filed Feb. 11, 1899.)
(No Model.) 3 Sheets—Sheet 3.
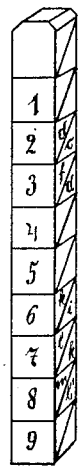
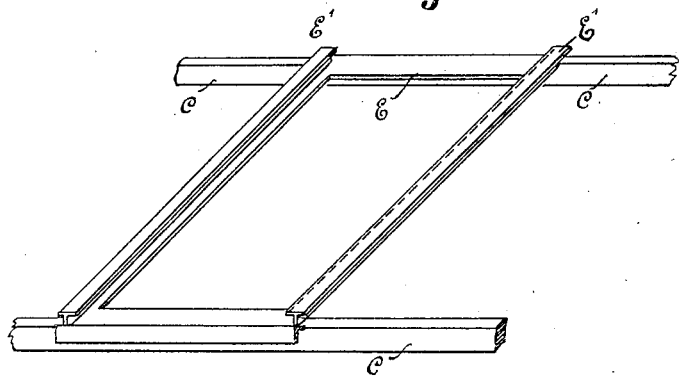

UNITED STATES PATENT OFFICE.

ÁRPÁD HORVÁTH, OF BUDA-PESTH, AUSTRIA-HUNGARY.

SYSTEM OF CALCULATING.

SPECIFICATION forming part of Letters Patent No. 641,294, dated January 16, 1900.

Application filed February 11, 1899. Serial No. 705,260. (No model.)

*To all whom it may concern:*

Be it known that I, ÁRPÁD HORVÁTH, a subject of the Emperor of Austria-Hungary, residing at Buda-Pesth, Austria-Hungary, have invented certain new and useful Improvements in Systems of Calculating, (for which I have applied for patents in England, dated December 24, 1898; in Germany, dated December 17, 1898; in Austria, dated December 23, 1898; in France, dated December 26, 1898; in Belgium, dated December 24, 1898; in Italy, dated December 22, 1898; in Switzerland, dated December 21, 1898; in Sweden, dated December 23, 1898, and in Norway, dated December 24, 1898,) of which the following is a specification.

This invention relates to a new or improved system of calculating, and comprises a system of calculating rods or bars, by means of which multiplication and division may be speedily and almost mechanically effected. The manipulation of these calculating-bars is far simpler than is the case with calculating-machines as hitherto constructed and may be readily mastered.

The invention is illustrated in the accompanying drawings, in which—

Figure 1 shows the eleven bars constituting the system. Figs. 2 to 6 illustrate various examples of the use of the said bars. Fig. 7 represents a pattern which enables the figures required to be more readily found. Fig. 8 is a plan view of the calculating-bars. Fig. 9 is a perspective view of the frame of a pattern. Fig. 10 is a perspective view of one of the calculating-bars.

The bars may be made of wood, metal, or other suitable material in the form of long rectangular prisms. The system of bars consists of an index-bar A and of ten or more calculating-bars B. One side of the index-bar A is divided into ten squares, as illustrated, the topmost of which forms what is termed the "head," while each of the remaining nine squares is marked in order with one of the numerals "1" to "9," running from top to bottom. The calculating-bars B are divided into ten squares upon each of their four sides. At the head of each side is marked one of the numerals from "0" to "9," (see Figs. 7 and 8,) while in the remaining divisions the product or the head figure and of the numerals of the series "1" to "9" is marked. (See Fig. 1.) Each of the divisions or squares is divided by means of a diagonal line into two triangles, in which the "unit" of the product is arranged below the diagonal and the "ten" above it, Fig. 1. In addition to this the triangular spaces below the diagonal are or may be colored—red, for example—in order to facilitate the finding of the required figures. In the topmost division there are also marked, in addition to the head figure, to the right and left and above it, smaller figures, indicating the head figures of the remaining sides of the bar.

In order to effect any operation of multiplication, those bars are selected the head numbers of which correspond with one of the factors. These bars B are laid beside the index-bar A in the order of the figures of the factor, and the figures of the other factor are found upon the index-bar. Upon a level with the figures so found the squares of the calculating-bars form separate horizontal columns, which contain the whole of the elements of the product sought. These elements are then added together in accordance with the value represented by their position in order to obtain the required product. This operation is illustrated in Fig. 2 by means of two simple examples. In the upper example (three multiplied by six hundred and forty-seven) a number consisting of one figure is to be multiplied by a number containing several figures. The one-figure factor "3" is found upon the index-bar, and the calculating-bars having the head figures "6," "4," and "7," which constitute the number "647," are laid beside the index-bar in the order named. In the horizontal columns which are on a level with the index figure "3" are to be found the numbers "18," "12," and "21," forming elements of the required product. If these elements are added together in a manner corresponding to the value of the position of the respective head figures in the number "647"—that is to say, the "ten" of "21" to the unit of "12" and the "ten" of "12" to the unit of "18"—the product "1,941" is obtained.

The example illustrated in the lower portion of Fig. 2 represents the operation of multiplying sixty-seven by six hundred and forty-seven, in which case the elements "36,"

"24," "42," "42," "28," and "49" are found in the horizontal columns opposite the index-figures "6" and "7." The addition of these elements in a manner corresponding to their place value is represented in Fig. 3, the figures in question being replaced by identical letters provided with various indices. The number having the lowest place value is designated by the letter $a$, which in the present case represents the unit and always stands in the last or outermost colored triangle of the topmost or undermost row. The sum of the numbers designated by $b'$, $b^2$, and $b^3$ gives the tens; the sum of the numbers designated by $c'$, $c^2$, $c^3$, and $c^4$, the hundreds; the sum of the numbers designated by $d'$, $d^2$, and $d^3$, the thousands, and the number designated by $e$, the ten-thousands. From this figure the rule may readily be deduced in accordance with which the elements must be added together—that is to say, the numbers which stand in the oblique row formed by the diagonals belong one to the other, or, in other words, have to be added together as if arranged in a vertical column, and the place value of these rows increases from the right to the left hand. This rule is of general application also in the case where the figures of the first factor do not constitute any connected portion of the series "1, 2, 3, 4, 5, 6, 7, 8, 9"— that is to say, when the horizontal columns of the elements do not stand directly one under the other, but when other columns not connected therewith come between them or when the figures in the factor form a connected but uniformly-falling series of numerals. In this latter case, however, the horizontal columns of the elements must be first arranged in the order in which the figures in the factor run. Concrete examples of such cases are shown in Figs. 5, 6, and 8. In Fig. 5 the multiplication of thirty-two and of eight hundred and seventy-six by a number containing three figures is represented. If the horizontal columns of the elements are arranged in an order corresponding with the factors thirty-two and six hundred and seventy-eight and the oblique rows bounded by the diagonals formed, the following results are obtained: In the case of the multiplication by thirty-two $a$ is the unit; $b + b' + b^2$, tens; $c + c' + c^2 + c^3$, hundreds; $d + d' + d^2$, thousands, and $f$, ten-thousands, while in the multiplication of eight hundred and seventy-six by a number containing three figures $g$ is the unit; $h + h' + h^2$, the tens; $i + i' + i^2 + i^3 + i^4$, the hundreds; $k + k' + k^2 + k^3 + k^4$, the thousands; $l + l' + l^2$, the tens of thousands, and $m$, the hundreds of thousands.

In Fig. 6 the multiplication of two hundred and fifty-eight by a number containing three figures is represented. When the horizontal columns opposite the indices "2," "5," and "8" are arranged directly one under the other, the following rows are formed: $a$, $b + b' + b^2$, $c + c' + c^2 + c^3 + c^4$, $d + d' + d^2 + d^3 + d^4$, $f + f' + f^2$, and $g$.

In Fig. 8 the multiplication of a number containing four figures by ninety-seven thousand five hundred and thirty-one is represented—that is to say, by a number in which the figures run in an order opposite to that of the natural numerical order, and thus form a constantly-decreasing arithmetical series. Assuming the horizontal column arranged in a line with the index "9" to be arranged above and below in accordance with the order of the columns "7," "5," "3," and "1," the figures of the oblique rows are obtained, as shown in Fig. 8, by identical lettering.

Finally, by means of Fig. 4 the case is represented in which one of the factors—such, for example, as four hundred and forty-four—consists of several identical figures. In this instance the result is obtained by the addition of three identical columns. In the foregoing case the following result is obtained (see the horizontal column opposite the index "4":) $a$, unit; $a + b + b'$, tens; $a + b + b' + c + c'$, hundreds; $b + b' + c + c' + d + d'$, thousands; $c + c' + d + d' + e + e'$, tens of thousands; $d + d' + e + e' + f + f'$, hundreds of thousands; $e + e' + f + f' + g'$, tens of millions, and $g'$ hundreds of millions. In order to check this rule, the multiplication two hundred and twenty-two by eight hundred and thirty-six thousand five hundred and seventeen may be effected by it.

From the above examples it will be seen that according as the figures of one of the factors assume a different position upon the index-bar, either in reversed numerical order separated one from the other by one or more numbers in reversed numerical order and separated, &c., the connected numbers must be sought by various but regular transitions. For the purpose of gaining experience in these transitions various forms or patterns may be employed which are cut in different places in such a manner that only the figures required—that is to say, the numbers forming an oblique row—are visible. Different patterns of course correspond to different transitions. A pattern of this kind is represented in Fig. 7, which is suitable for effecting the multiplication ninety-seven thousand five hundred and thirty-one by one hundred and twenty-three million four hundred and fifty-six thousand seven hundred and eighty-nine, which represents tens of millions. The various groups of numbers are rendered visible by the stepwise displacement of the pattern in a lateral direction. In order to render the manipulation of the pattern more easy, the bars, as shown in Figs. 7 and 8, are laid between two parallel rails C, over which the pattern may be laterally displaced.

In Fig. 8 the rails are arranged in a box D, thereby enabling the whole device to be conveniently carried or stored.

In order to be able to adjust the patterns to the various columns in the direction of their height also, they are arranged in frames in such a manner that they may be slid up and down. Fig. 9 is a perspective view of such a frame. The frame E itself is capable of being displaced along the rails C, while the pattern may be displaced in the direction of its height beneath the members E' E' of the frame. As already stated, however, the use of these patterns is soon rendered unnecessary by practice so much the more that the coloring, red or otherwise, of the triangular spaces beneath the diagonals enables the oblique rows to be readily located and affords a resting-point for the eye when looking for connected numbers.

What I claim, and desire to secure by Letters Patent of the United States, is—

A system of calculating-bars, consisting of an index-bar upon which the figures "1" to "9" are inscribed in squares or divisions in numerical order, in combination with calculating-bars carrying at their respective heads the figures "0" to "9" and below them in squares or divisions the multiples of the respective head figures, whereby the product of a number on the index-bar by the head numbers on the calculating-bars may be caused to lie in a horizontal row by placing the bars involved, side by side, substantially as described.

In testimony whereof I have hereunto set my hand in the presence of two witnesses.

ARPÁD HORVÁTH.

Witnesses:
 GENSEN RÉTY,
 BAIES LARSO.